May 30, 1967  G. ANDERS  3,322,402
APPARATUS FOR CONTINUOUS PREPARATION OF A SOLUTION
CONTAINING MILK, FAT AND SUGAR
Filed Nov. 19, 1963
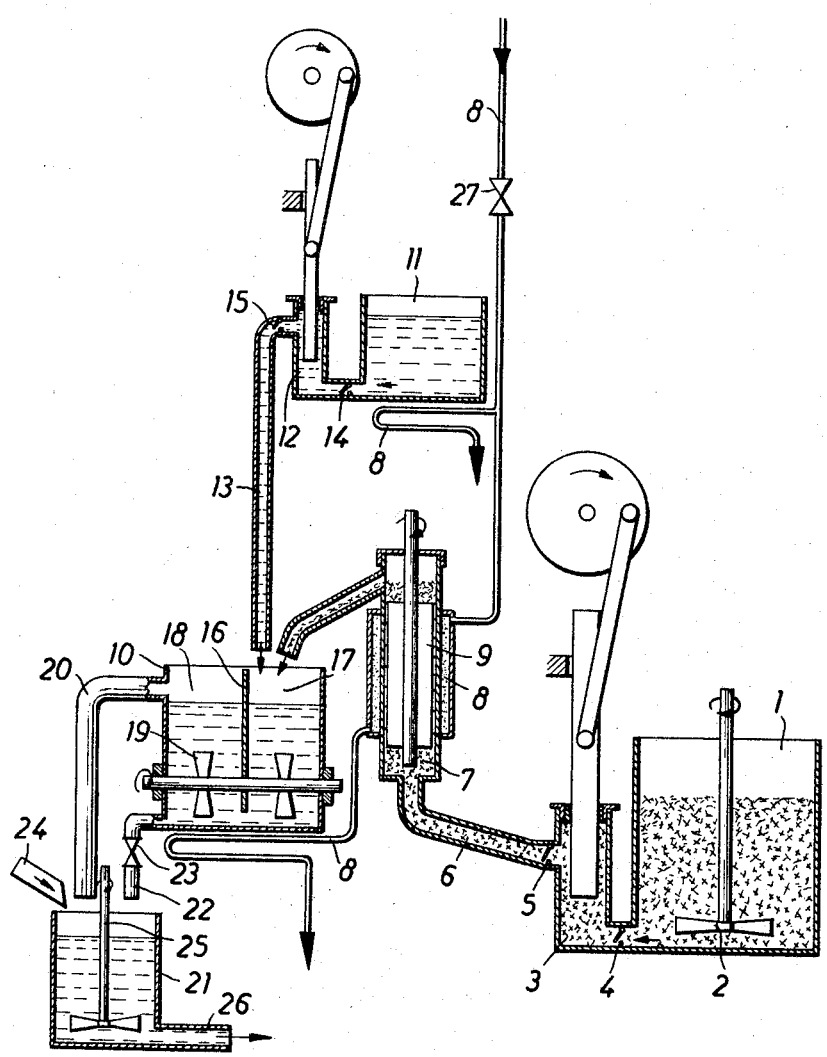
INVENTOR:
GERHARD ANDERS
BY Frederick Breitenfeld
ATTORNEY

# United States Patent Office 3,322,402
Patented May 30, 1967

3,322,402
APPARATUS FOR CONTINUOUS PREPARATION OF A SOLUTION CONTAINING MILK, FAT AND SUGAR
Gerhard Anders, Viersen, Germany, assignor to Hamac-Hansella Aktiengesellschaft, Viersen, Germany, a corporation of Germany
Filed Nov. 19, 1963, Ser. No. 324,747
Claims priority, application Germany, July 2, 1963, H 49,621
12 Claims. (Cl. 259—6)

ABSTRACT OF THE DISCLOSURE

Separate milk and fat reservoirs are provided, and pumps conduct milk and fat to a first mixing chamber. The pumps are driven in synchronism by a single power source, e.g. the sugar-glucose dissolving machine, but the pump outputs are independently adjustable. Milk-fat mixture flows from first mixing chamber to a second mixing, which is also supplied with a sugar-glucose solution, wherein final composition is produced.

---

This invention relates to a procedure and apparatus for the continuous automatically controlled production of a solution of milk, fat and sugar, for use in a candy cooking machine.

In the production of candies, it is well known to employ a candy cooking machine in association with a machine for producing a sugar-glucose solution in such a way that the required crystalline sugar is dissolved, glucose added, and the solution fed to the cooking machine. The preparation of the candy material is automatic in this kind of installation, and a candy mass of uniform composition and quality can be readily produced. However, it has not been possible, heretofore, to achieve an automatic continuous production of a candy mass, with uniformly maintained composition, for candies containing milk and/or fat, such as, for example, hard or soft caramel candies. In such cases, the solutions of sugar, milk and fat supplied to the candy cooking machine have always been prepared in separate batches. Thus it was unavoidable that the milk and fat content of the confectionery was not always uniform. For example, if the fat isn't uniformly introduced or stirred into the solution, or if a separation of fat occurs in the time between the production of the solution and its use, an undesired non-uniformity results. Under such circumstances, in order to comply with the laws prescribing milk and fat content of foodstuffs, the manufacturer has heretofore been compelled to use unnecessarily large amounts of milk and fat at the outset, so as to make sure that the resultant products, formed of even the leanest cooking mixture, have contained the legally required milk and fat content.

The object of the present invention is to overcome these disadvantages, and to provide a process and apparatus for the production of a candy mass containing predetermined proportions of sugar, milk and/or fat, by means of a substantially simpler procedure. Another object is to provide a process which is more economical in practice and more reliable in preparing a uniform mixture, the economies resulting in large measure from the fact that for the maintenance of a prescribed milk and fat content only the requisite amounts of milk and fat constitutents need be employed. It is contemplated that the apparatus according to this invention will be used in a candy making installation between the known dissolving machine in which the sugar-glucose solution is produced, and the known cooking machine, the apparatus being one which can be employed to create a fully automatic continuously operating readily adjustable and reliably controllable installation as a whole.

For the attainment of this objective the procedure is characterized by the steps whereby pre-warmed milk and pre-warmed fat are separately pumped or fed from independent supplies thereof to a first mixer, there thoroughly mixed, then fed to a second mixer to which there is fed, at the same time, a sugar-glucose solution supplied by the usual dissolving machine. All these substances are thoroughly mixed in the second mixer, and fed from there to the candy cooking machine; and all the pumps are synchronously controlled by the dissolving machine, i.e., the feeding of the milk and fat constituents to the first mixer is performed in synchronism with the production of the sugar-glucose solution.

An apparatus for carrying out this procedure embodies the following features if it is constructed in accordance with the present invention: A milk supply is provided, adapted to hold the total quantity required for a predetermined production period. A milk pump conducts the milk from this supply in counter-flowing heat-exchange relationship to a heating medium flowing through a special milk pre-warmer. The pre-warmed milk is fed to a first mixing chamber, while a pump for fat similarly conducts pre-warmed fat from a heated fat supply to said mixer. A special stirring arrangement is provided in the mixing chamber. A further mixing chamber is provided, to which the solution of milk and fat from the first mixer, along with a sugar solution from the dissolving machine, is fed, and the second mixing chamber embodies a stirring mechanism for thorough intermixture of the contents of said second mixing chamber, thereby producing the desired final solution.

A special feature of the invention resides in making the milk pump and the fat pump separately adjustable to vary the amounts fed, whereby the proportions of these ingredients can be reliably varied, as may be required, and reliably maintained at predetermined values.

Further details of the invention will be disclosed in the following description of an illustrative example of an apparatus embodying the features of the invention, and reference will be made to the accompanying drawings in which an apparatus embodying the features of the invention is schematically represented.

The apparatus shown consists of a milk supply container 1 in which a stirring mechanism 2 is provided so that separation of the cream can be avoided. Salts and other ingredients called for by any particular recipe may be introduced into the milk at this stage. A milk pump 3 is associated with the container 1, and the inlet and outlet of the milk with respect to the pump 3 are governed by two one-way valves 4 and 5 respectively. A pipe or conduit 6 leads from the milk pump to a milk pre-warmer 7, and in the illustrated embodiment of the invention the milk passes through the warmer in an upward direction, while a heating medium 8 flows through a jacket surrounding the milk passage and in the opposite direction. A heat-exchange counter-flow arrangement is thus established. Within the warmer is a scraper 9 to provide a means for avoiding the deposit of solidified particles on the outer heated wall of the milk passage.

From the warmer 7 the pre-warmed milk flows to a mixing chamber 10 presently to be described.

The fat to be used is contained in a separate supply vessel 11, and by means of a fat pump 12 it is independently transmitted through the conduit 13 to the mixing chamber 10. The entry and discharge of the fat with respect to the pump 12 are regulated by the one-way valves 14 and 15 respectively. The supply vessel 11 is associated with the heating system 8 so that the fat in the vessel 11 is warmed and retained in a warmed condition.

In the illustrated embodiment, the mixing chamber 10 is divided by a partition 16 into two compartments 17 and 18. The partition 16 does not reach the floor of the chamber, but leaves a restricted communication between the compartments 17 and 18 at the bottom, through which the mixture can move from one part to the other. It is within the scope of the invention to provide more than one partition 16 to form correspondingly more chambers, in series, in communication with on another as shown, the final compartment of the train being the outlet compartment.

In the mixing chamber 10 there is a mixing device 19. By way of example, the drawings show a device extending horizontally near the bottom of the chamber, consisting of a horizontal rotating shaft and at least one agitating blade or blades in each of the partitioned chambers 17 and 18.

The mixing chamber 10 is also associated with the heating system 8 so that the material within it is warmed and can if desired be maintained at a constant predetermined temperature by means of appropriate thermostatic controls (not shown). Milk and fat are fed into the first compartment 17 of the mixing device, while the second (i.e., in this case the last) compartment 18 is provided with an overflow 20 leading to a further mixing chamber 21. Additionally, the compartment 18 is provided with a conduit 22 leading from its lower end, this conduit also conducting fluid to the mixing chamber 21. A valve 23 is advantageously provided in the pipe 22.

Leading to the mixing chamber 21 is also a conduit 24 which comes from the dissolving machine (not shown) in which the sugar-glucose solution is produced in known manner. The pipe 24 feeds the sugar-glucose solution to the chamber 21. A mixing or agitating device 25 provides for thorough intermixture of the sugar-glucose solution with the milk-fat mixture introduced through the conduits 20 and/or 22. From the floor of the mixing chamber 21 a conduit or pipe 26 conducts the mixture to the candy cooking machine (not shown) and in the pipe 26 a suitable feed pump can be installed for the purpose.

In accordance with the invention, the pumps 3 and 12 for the milk and fat, respectively, are independently driven, and are controlled by the driving mechanism of the dissolving machine. By any appropriate means (not shown) the pumps are driven in synchronism with the production of the sugar-glucose solution, whereby the proportionate amounts of the various constituents can be uniformly maintained. Moreover, the pumps 3 and 12 are individually adjustable so that their outputs can be varied. Any appropriate means may be provided for this purpose. For example, the points at which the connecting rods are pivoted to their respective driving discs may be shiftable in radial directions, thus varying the strokes of the pumps. By activating the pumps 3 and 12 at different capacities it is readily possible to vary the relative amounts of milk and fat in the solution that is fed to the candy cooking machine, and after selected adjustments have been made, a constant proportionate relationship of the ingredients of the mixture can be easily maintained.

By the provision of the agitating devices in the mixing chambers 10 and 21 it is possible to maintain the mixture in a thoroughly stirred condition throughout the apparatus and up to the very time it is delivered to the candy cooking machine.

A valve 27 in the heating system makes it possible to maintain the mixture at any desired predetermined temperature.

It follows from this disclosure that the apparatus can readily be interposed between a dissolving machine and a candy cooking machine. The employment of such machines for the automatic and continuous production of material for milk-free and fat-free candies is known, but whereas in such known machines the conduit or pipe 24 is usually connected directly to the pipe 26, the present improved apparatus interposes the mixing chamber 21 in this chain of communication, whereby in the described manner it is possible to introduce predetermined controlled proportionate amounts of milk and fat to the desired final solution.

What is claimed is:

1. An apparatus for continuous preparation of a candy solution containing milk and fat constituents, comprising a vessel for a supply of milk, a vessel for a supply of fat, a first mixing chamber, a milk pump for transferring milk from the milk supply to said mixing chamber, a separate fat pump for transferring fat from the fat supply to said mixing chamber, a second mixing chamber adapted to receive a sugar-glucose solution separately produced, means for transferring the milk-fat mixture from said first mixing chamber to said second mixing chamber, means in the latter chamber for blending the ingredients therein to produce the desired final candy solution, and means for independently regulating the outputs of said pumps so that the proportions of milk and fat in said final solution can be accurately controlled.

2. An apparatus as defined in claim 1, in which the milk supply vessel is large enough to hold all the milk required for a predetermined period of operation.

3. An apparatus as defined in claim 1, in which there is an agitator in the milk supply vessel to prevent separation of the cream.

4. An apparatus as defined in claim 1, in which there is a means for pre-warming the milk on its way to the first mixing chamber.

5. An apparatus as defined in claim 4, in which said pre-warming means comprises a warming chamber through which the milk is conducted, and means associated with said warming chamber for directing a heating medium in counter-flow heat-exchange relation to the milk during its passage through said warming chamber.

6. An apparatus as defined in claim 5, in which said heating medium is in a jacket encircling the warming chamber, and in which there is a scraper in said chamber to prevent accumulation of a hardened deposit upon the heated wall of said chamber.

7. An apparatus as defined in claim 5, in which a means is provided for also conducting said heating medium in warming relation to the fat supply vessel and to said first mixing chamber.

8. An apparatus as defined in claim 1, in which there is a means for retaining the fat supply in a predetermined heated condition.

9. An apparatus as defined in claim 8, in which said fat heating means comprises a means for directing a heating medium into heating proximity to said fat supply vessel.

10. An apparatus as defined in claim 1, in which said first mixing chamber has at least one partition defining separated compartments and provided with an opening allowing only restricted communication between said compartments adjacent to the floor, the milk-fat mixture being constrained to travel from one compartment to the next.

11. An apparatus as defined in claim 10, in which there is a mixer in said mixing chamber comprising a horizontal rotatable shaft and blades carried by said shaft and located in said compartments respectively.

12. An apparatus as defined in claim 10, in which one of said compartments is an outlet compartment, said means for transferring the milk-fat mixture comprising an overflow pipe leading from the upper part of said outlet compartment and a valve-controlled pipe leading from a point adjacent to the floor of said outlet compartment.

References Cited

UNITED STATES PATENTS

| 1,733,497 | 10/1929 | Kirschbraun | 259—64 |
| 1,983,319 | 12/1934 | Simpson | 259—64 |
| 2,260,834 | 10/1941 | Everett | 259—10 |
| 2,835,481 | 5/1958 | Cox | 259—1 |

WILLIAM I. PRICE, *Primary Examiner.*

WALTER A. SCHEEL, *Examiner.*

R. W. JENKINS, *Assistant Examiner.*